(No Model.) 2 Sheets—Sheet 1.

W. STRAIT.
PLOW.

No. 551,877. Patented Dec. 24, 1895.

WITNESSES
F. D. Nottingham
G. F. Downing.

INVENTOR
William Strait.
by F. B. Brock
atty (No Model.) 2 Sheets—Sheet 2.

W. STRAIT.
PLOW.

No. 551,877. Patented Dec. 24, 1895.

WITNESSES
E. J. Nottingham
G. F. Downing

INVENTOR
William Strait
by F. B. Brock
Att'y.

UNITED STATES PATENT OFFICE.

WILLIAM STRAIT, OF ELMIRA, NEW YORK.

PLOW.

SPECIFICATION forming part of Letters Patent No. 551,877, dated December 24, 1895.

Application filed March 22, 1886. Serial No. 196,071. (No model.)

*To all whom it may concern:*

Be it known that I, WILLIAM STRAIT, of Elmira, in the county of Chemung and State of New York, have invented certain new and useful Improvements in Plows; and I do hereby declare the following to be a full, clear, and exact description of the invention, such as will enable others skilled in the art to which it appertains to make and use the same.

My invention relates to an improvement in plows.

Hitherto, particularly in that class of plows known as "reversible moldboard or sidehill plows," there has been great difficulty experienced in regulating the angle formed by the line of draft and direction of plow-point or path of the plow so as to admit of taking the desired amount of land or width of furrow on either right or left sides, and yet allow the horses to travel in the most advantageous positions. So great has been this difficulty that the use of three horses drawing side by side has been considered inexpedient in connection with sidehill plowing.

The object of my present invention is to provide a plow in which the angle formed by the line of draft and direction of plow may be varied at the will of the plowman while in his position at the handles and while the plow is in motion or at rest.

A further object is to provide a reversible moldboard or sidehill plow which will admit of the use of three-horse draft and which will be eminently effective, durable, and economical.

With these ends in view my invention consists in certain features of construction and combinations of parts, as will be hereinafter described, and pointed out in the claims.

Figure 1:
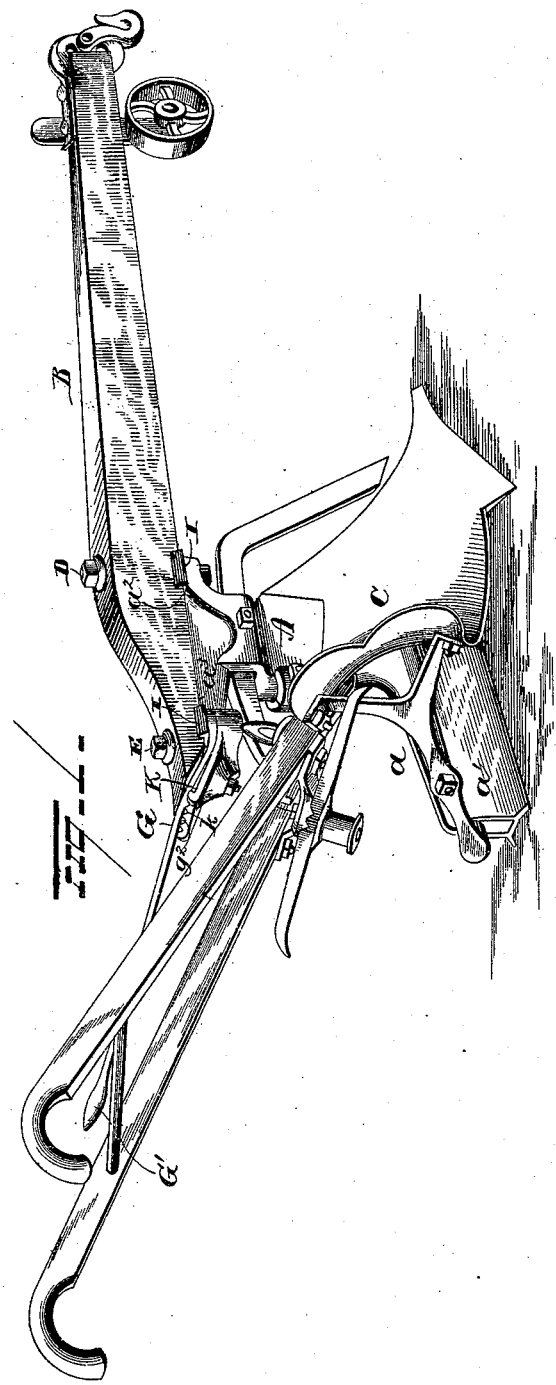
Figure 2:
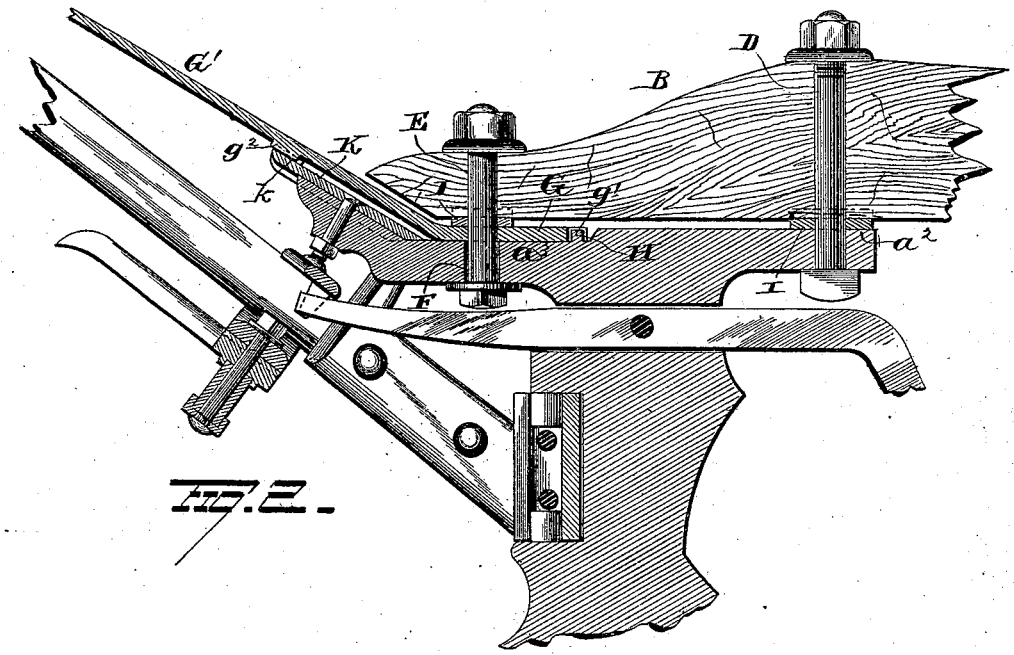
Figure 3:
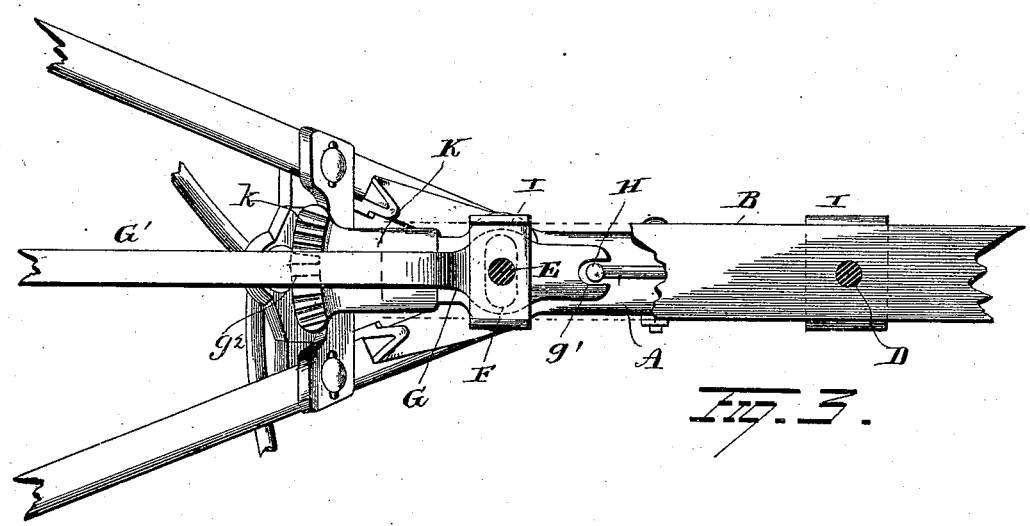

In the accompanying drawings, Figure 1 is a view of the plow in perspective. Fig. 2 is a top plan view, and Fig. 3 is a partial vertical section.

A represents the plow-standard, B the plow-beam, and C the reversible moldboard.

The standard A terminates at its lower end in an elongated solid foot or bar $a$, on the bottom and two sides of which the double landside $a'$ is secured.

The upper end of the standard is elongated in the direction of the length of the beam, and at or near the forward portion of the horizontally-elongated upper end it is provided with a flat somewhat-extended bearing $a^2$, on which the lower side of the beam B rests, and to which the beam is secured in a laterally-swinging adjustment by a pivotal bolt D or by other suitable means.

The rear end of the plow-beam is secured to the rear projection of the upper end of the standard by a bolt E or its equivalent, which extends through the beam and through a transversely oblong slot F in the bearing $A^3$, whereby the rear end of the plow-beam is allowed a limited transverse movement.

Between the lower face of the beam and the bearing $a^3$ is inserted a flat plate or bar G, which has a pivotal bearing on the bolt E, and extends from thence forwardly to a stud, lug or bolt H, either formed integral with or rigidly secured to the standard, and which forms a fulcrum for the lateral working of the plate or bar G. The forward end of the plate or bar G is preferably provided with an open slot $g'$, adapted to receive the stud, lug or bolt H; but it might be provided with a closed slot or perforation, if found preferable.

The under side of the beam is preferably provided with bearing-plates I over the bearings $a^2$ and $a^3$.

The flat plate or bar G, fulcrumed, as described, on the stud, lug or bolt H on the standard, projects rearwardly in a spring-handle $G'$ to within convenient reach of the plowman.

The under side of the handle $g$ is provided with a lug or projection $g^2$, which is adapted to automatically engage a series of notches $k$ on the upper face of a plate K, bolted or otherwise secured to the rear upper end of the standard.

The spring-tension and weight of the lever-handle $G'$ both combine to lock the lever in its adjustment in any one of the notches.

The operation will be readily understood. The plowman by swinging the handle $g$ of the lever to the right or left will swing the rear end of the plow-beam to the right or left, and hence the forward end of the plow-beam to the left or right, increasing or diminishing the angle formed by the line of draft and direction of the plow-point, and causing it to take more or less land, as desired. Furthermore, the adjustment of the beam may be made with perfect ease while the team is drawing the plow, or it may be made when the plow is at rest, and in whatever position the beam may be thrown by the lever G' it will become automatically locked therein until again disturbed by the positive act of the operator.

The handles secured to the standard in laterally-swinging adjustment, the colter secured in the slot in the standard, and the double hook for securing the moldboard on the right or left hand side, as also the hereinbefore-described double landside or shoe on the bottom of the standard, are features which have hitherto been secured by Letters Patent, and form no part of my present invention, except so far as they contribute to the operation and effectiveness of the whole.

I am aware that a plow-beam pivoted to the upper end of a standard and held in locked adjustment by a movable dog is not new, and hence I make no claim, broadly, to such a construction.

It is evident that other forms of leverage than that shown and described might be employed to swing the rear end of the beam laterally while the team is drawing the plow or while the plow is at rest, and other slight changes might be resorted to in the form and arrangement of the several parts described, without departing from the spirit and scope of my invention. Hence I do not wish to limit myself strictly to the construction herein set forth; but, Having fully described my invention, what I claim as new, and desire to secure by Letters Patent, is—

1. In a plow the combination with a plow standard and a plow beam pivoted thereto of a lever pivoted to the standard and connected to the beam and adapted to swing said beam laterally, substantially as set forth.

2. In a plow, the combination with a standard having an enlarged bearing, handles rigid with said standard, and a beam pivoted to the front end of the enlarged bearing, of a lever pivoted to the standard and connected to the beam and adapted to swing said beam laterally, and a rack to secure the lever when adjusted, substantially as set forth.

3. The combination with the standard, the beam pivoted to the front end thereof and the bolt passing through the rear end of the beam and through the transversely oblong slot in the standard, of a lever pivoted to the standard and engaging the bolt, substantially as set forth.

4. In a plow the combination with the standard having an elongated bearing, the beam pivoted to the front end thereof, and the bolt loosely connecting the rear end of the beam with the rear end of the bearing, of the spring lever pivoted to the standard and connected to the beam, substantially as set forth.

5. In a plow, the combination with the standard having an elongated bearing the latter having an oblong slot, a notched plate secured to said bearing, a beam pivoted to the standard in front of the slot and notched plate and a bolt secured to the beam and passing through the slot, of the beam operative lever pivoted to the standard and engaging the notched plate, substantially as set forth.

6. The combination in a plow, of a standard, a beam having a laterally swinging movement thereon, mechanism for swinging the beam upon the standard from side to side, and an actuating device extending rearwardly within reach of the operator, and operative from behind the handles, whereby the plow is turned to or from land while working.

7. In a plow, the combination of a standard, a beam having a laterally swinging movement upon the standard, mechanism for adjusting the beam laterally from side to side, and independently shifting handles, substantially as set forth.

In testimony whereof I have signed this specification in the presence of two subscribing witnesses.

WILLIAM STRAIT.

Witnesses:
GEO. F. DOWNING,
E. C. SEWARD.